United States Patent
Hart et al.

(10) Patent No.: US 6,790,395 B2
(45) Date of Patent: Sep. 14, 2004

(54) METHOD FOR PRODUCING A THERMOPLASTIC FILLER

(76) Inventors: Rainer Hart, Engerscr Landstrasse 38, 56170 Bendorf-Sayn (DE); Darco Kunsic, In der Ahl 1, 56727 Mayen (DE)

( * ) Notice: Subject to any disclaimer, the term of this patent is extended or adjusted under 35 U.S.C. 154(b) by 0 days.

(21) Appl. No.: 10/233,780

(22) Filed: Sep. 3, 2002

(65) Prior Publication Data

US 2003/0165357 A1 Sep. 4, 2003

Related U.S. Application Data

(63) Continuation of application No. PCT/DE01/00803, filed on Mar. 1, 2001.

(30) Foreign Application Priority Data

Mar. 3, 2000 (DE) .......................... 100 10 451

(51) Int. Cl.⁷ .......................... B29C 35/16; B29C 35/02; B29B 7/36; B29B 9/08
(52) U.S. Cl. .................... 264/115; 106/281.1; 106/282; 106/284; 106/285; 404/75; 524/59; 524/71
(58) Field of Search ................................. 264/112, 115; 106/281.1, 282, 284, 285; 404/75; 524/59, 71

(56) References Cited

U.S. PATENT DOCUMENTS

| | | | | |
|---|---|---|---|---|
| 1,954,997 A | * | 4/1934 | Hirzel | 106/281.1 |
| 2,978,351 A | * | 4/1961 | Pullar | 428/403 |
| 4,069,181 A | * | 1/1978 | Healy et al. | 524/70 |
| 4,236,675 A | * | 12/1980 | Bladykas | 241/65 |
| 4,613,376 A | * | 9/1986 | Nilsson et al. | 106/282 |
| 4,756,763 A | * | 7/1988 | Etnyre | 106/281.1 |
| 5,008,311 A | * | 4/1991 | Janoski | 524/59 |
| 5,028,266 A | * | 7/1991 | Rettenmaier | 106/282 |
| 5,405,440 A | * | 4/1995 | Green et al. | 106/281.1 |
| 6,362,257 B1 | * | 3/2002 | Chehovits et al. | 524/59 |

FOREIGN PATENT DOCUMENTS

| | | | | |
|---|---|---|---|---|
| DE | 3817064 A1 | * | 11/1989 | C08J/3/12 |
| DE | 44 02 369 A | | 8/1995 | |
| DE | 196 51 749 A | | 6/1998 | |
| DE | 99 03 314 A | | 8/1999 | |
| EP | 0099864 A2 | * | 2/1984 | E01C/7/22 |
| EP | 0 507 037 A | | 10/1992 | |
| JP | 06-041906 A | * | 2/1994 | E01C/7/18 |
| JP | 2001-081308 A | * | 3/2001 | C08L/75/04 |

OTHER PUBLICATIONS

English Machine Translation of JP-06-041906-A, Oct. 2003, Japanese Patent Office website.*
English Machine Translation of JP-2001-081308-A, Oct. 2003, Japanese Patent Office website.*
Derwent Abstract of SU 673650 A, 1999, Derwent Week 1980–12, Derwent Information Limited.*
Merkblatt für die Erhaltung von Asphaltstrassen, Der Bundesminister für Verkehr, Feb. 21, 1991.
TL Min-StB 94, Forschungsgesellschaft für Strassen-und Verkehrswesen, 1994.
Din En 1097–3, Prüfverfahren für mechanische und physikalische Eigenschaften von Gesteinskörnungen, Jun. 1998.

* cited by examiner

*Primary Examiner*—Michael Colaianni
*Assistant Examiner*—Michael I. Poe
(74) *Attorney, Agent, or Firm*—Henry M. Feiereisen; Ursula B. Day

(57) ABSTRACT

A method for producing a thermoplastic filler for eliminating surface damage to concrete or asphalt surface is disclosed which includes mixing stone chips, sand, a powdered material and a bituminous binding agent to a homogenous mixture which is in constant motion at a temperature of between about 180° C.–2400° C., with a coolant being added subsequently to the mixture in a rapid manner thereby converting the mixture into a non-cohesive granulate of small pellets due to the high surface tension of the various constituents, and wherein the granulate can be heated to convert it to a free-flowing or spreadable filler having strong adhesive properties.

8 Claims, No Drawings

METHOD FOR PRODUCING A THERMOPLASTIC FILLER

CROSS-REFERENCES TO RELATED APPLICATIONS

This application is a continuation of prior filed copending PCT International application no. PCT/DE01/00803, filed Mar. 1, 2001.

This application claims the priority of German Patent Application Serial No. 100 10 451.7, filed Mar. 3, 2000, pursuant to 35 U.S.C. 119(a)-(d).

BACKGROUND OF THE INVENTION

The present invention relates to a method for producing thermoplastic filler, and in particular also to a method for producing a thermoplastic filler for eliminating surface damage to concrete or asphalt surfaces, or for caulking joints of buildings.

FIELD OF THE INVENTION

Descriptions of suitable construction methods for the preservation of asphalt paved roads having a large surface and/or depth are usually found in the relevant manuals and codes of practice. Noted herein is for example ZTV asphalt, code of practice for the preservation of asphalt roads, or for example also the part relating to "Thin Layers in Cold Mix Application" and similar.

The construction operations which are set forth and described in the afore-mentioned regulation publication require foremost the application of large machinery and require the respective large number of personnel.

The known construction operation is thus economically feasible only in connection with large surfaces or when large numbers of construction or repair and reconstruction is required.

Using the known methods is not satisfactory to permanently eliminate defects, especially small volume defects or varying level defects and damages that occur in roads and surfaces, such as for example pot holes of varying depth or sizes, cavities, tears, fissures, flat erosions and similar and that can be eliminated in an economically feasible way.

It would therefore be desirable and advantageous to provide an improved method to obviate these prior art shortcomings by providing a method for the production of thermoplastic filler, which is suitable for eliminating small volume road defects in an economically efficient and lasting manner.

SUMMARY OF THE INVENTION

According to one aspect of the present invention, a method is provided for the production of a thermoplastic filler suitable for eliminating surface damage of concrete and/or asphalt surfaces and which is also for covering respectively joints in buildings, wherein stone chips, sand, a powdered material and bituminous binding agent are homogeneously mixed at a temperature of about 180° C. to 240° C. and thereafter applying a cooling shock to the mixture which is kept under continuous agitation.

DETAILED DESCRIPTION OF PREFERRED EMBODIMENTS

In one feature of the present invention, the method comprises the steps of mixing stone chips, sand and powdered material together with a bituminous binding agent in a metered drum or/and respectively a dry mix drum to produce a homogenous mixture at a temperature of about 180° C. to 240° C. The various mixing ingredients can be mixed together in a random order. A preferred temperature for the mixture is about 220° C. The mixture, which is continuously agitated or stirred is then submitted to a cooling shock by adding to the mixture a coolant which is in either liquid, solid or semi-solid form. "Cooling shock" in this context means an intensive and short-timed supply of coolant. By means of the cooling shock, the mixture of highly bonding mass of viscous consistency is being converted into a non-cohesive loose-grained mini-granulate without adhesive quality, which is due to the very high surface tension of the various compounds of the mixture.

The amount of coolant that is supplied is dependent on the respective composition of he mixture and is generally between about 5% and 30% of the total mixture. In any case, it is advantageous to supply a surplus of the coolant to the mixture in order to prevent that a smeary film forms on the granules or pellets and to thereby avoid caking, so that the granulate is rendered in the form of loose-grained pellets which facilitates transport of the finished granulate.

After the addition of the coolant, the temperature of the finished granulated mixture is preferably under 80° C.

Depending on the location to where the finished granulate mixture is to be brought, the largest grain or pellet size of the finished mixture can be between about 1 mm and 20 mm. Filling the pores of the grain skeleton texture of the mixture is realized by the presence of the sand, the powdered material and the bituminous binding agent.

According to one aspect of the method according to the invention, it is possible to use water of sufficiently cold temperature as coolant. Furthermore, dry ice, ice or other coolants generally used are suitably used.

The filler produced according to the invention in the form of the granulate having a loose-grained consistency can, for example, be packaged for delivery in paper- or plastic sacks of varying size. The packaging size can be made dependent on the size of the damage or the extent of the repair that is to be made.

It is particularly advantageous to use the filler produced according to the invention to eliminate holes and tears and similar defects that appear on racing surfaces for automobiles and motor cycles from use in training or from racing due to mechanical stress on these surfaces. Defective spots in those surfaces, which are also generated due to spilled fuel and lubricants which act as solvents on these surfaces, can also be eliminated. In conducting such repairs, a pre-determined amount of filler in a pre-packaged sack of the size necessary to cover the extent of the damage can be provided at the site. The filler is being heated proximate the site in a heating vat, in particular this can also be done in a microwave device used for such purposes, whereby the filler mixture is converted into a pourable filler compound, respectively a filler compound which can be spread on the surface and which is of high adhesiveness. The filler compound can be poured directly into the damaged site that is to be leveled and can be smoothed with a spatula, leveled out and then covered with grit and properly pressed. In this manner it is possible to eliminate the road- and other surface defects easily and perfectly.

It is of course possible to use the filler produced according to the invention also for repairing deeper holes and those damage sites having much larger surfaces.

It is another feature of the invention, that the filler produced according to the invention can be used in building construction where for example gaping joints and fissures can also be filled quickly and perfectly.

In a preferred embodiment the filler produced according to the invention is composed of about 60% by weight stone chips, about 10% to 40% by weight sand, about 15% to 30% by weight powdered material and about 6% to 10% by weight binding agent. The powdered material in the form of a so-called filler agent is crushed natural stone with a grain size below 0.09 mm. The sands used for the filler produced in accordance with the method of the invention have a grain size of between about 0.09 mm and about 2 mm and the stone chips in the form of crushed or non-crushed mineral aggregate grains are of a grain size above 2 mm. These sizes are in accordance with the information in accordance with the technical supply conditions for mineral aggregates for road construction (TL-Min.).

Depending on its composition, a filler compound produced according to the method of the invention of the type described herein has an apparent weight of 1.2 to 1.6 kg/dm$^3$, a bulk porosity of from 30.0% to 60.0% by volume, a granulate bulk density of from 2.2 to 2.6 kg/dm$^3$ and a granulate surface of from 0.2 to 3.0 m$^3$/kg respectively 500 to 2000 m$^2$/m$^3$, each computed according to EN 1097-3 respectively according to the diagram of particle distribution according to Rosin and Rammler.

In accordance with yet a further embodiment of the invention, stabilizing agents/materials of 0.2 weight % to 6 weight % with respect to the mixture can be added. In particular, these can be of mineral or non-mineral source (fiber material) which are listed in the code for stabilizing supplements or agents.

In accordance with yet a further embodiment of the invention, the mixture or already the binding agent (bitumen) can be hardened by polymerization in order to improve adhesiveness and extend its range of plasticity. The amount to be added is calculated with respect to the amount of binding agent in the mixture and is in the range from 2 to 8 weight % (absolute)

It is further within the scope of the invention, that the mixture is being hydraulically hardened. "Hydraulic hardening", which can also be used in the afore-described embodiments, in this context means the admixture of among others, commercially available cement and/or calcium hydrate. The amount to be added is with respect to the amount of binding agent present and is 20 weight % to 60 weight % (relative).

While the invention has been illustrated and described as embodied in a method for producing filler for repairing defective asphalt and concrete surfaces, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for producing a thermoplastic filler for use in eliminating surface damage in concrete and asphalt surfaces and as a joint compound comprising the steps of:

mixing stone chips, sand, a powdered material and a bituminous binding agent into a homogenous mixture, heating the mixture to a temperature of about 180° C. to 240° C. under constant agitation and thereafter subjecting the mixture to a cooling shock by cooling the mixture, in a rapid manner, wherein the rapid cooling is carried out by adding a coolant to cool the mixture to below about 80° C. to thereby obtain a loose-grained mini-granulate.

2. The method of claim 1, wherein the stone chips, the sand, the powdered material and the binding agent are mixed in amounts by weight percent as follows:

| Stone chips | 30–60 |
| --- | --- |
| Sand | 10–40 |
| Powdered material | 15–30 |
| Binding agent | 6–10. |

3. The method of claim 1, and further comprising the step of hardening the mixture by polymerization.

4. The method of claim 1, wherein the temperature is about 220° C.

5. The method of claim 4, wherein the stabilizing agent is a fibrous material.

6. The method of claim 1, and further the step of adding a stabilizing agent.

7. The method according to claim 6, wherein the amount of stabilizer added is in the range of about 0.2 weight % to about 6 weight % with respect to the mixture.

8. The method of claim 6, wherein the mixture is subjected to hydraulic hardening.

* * * * *

UNITED STATES PATENT AND TRADEMARK OFFICE
CERTIFICATE OF CORRECTION

PATENT NO. : 6,790,395 B2
DATED : September 14, 2004
INVENTOR(S) : Rainer Hart and Darco Kunsic It is certified that error appears in the above-identified patent and that said Letters Patent is hereby corrected as shown below:

<u>Title page,</u>
Item [57], ABSTRACT,
Line 6, replace "2400ºC" with -- 240ºC --

Signed and Sealed this

Fourth Day of January, 2005

JON W. DUDAS
*Director of the United States Patent and Trademark Office*